(12) United States Patent
Tanaka et al.

(10) Patent No.: US 9,735,636 B2
(45) Date of Patent: Aug. 15, 2017

(54) ROTOR AND DYNAMO-ELECTRIC MACHINE HAVING THE SAME

(71) Applicant: DENSO CORPORATION, Kariya, Aichi-pref. (JP)

(72) Inventors: Asuka Tanaka, Kariya (JP); Akihiro Kimura, Chiryu (JP); Jirou Hayashi, Ama (JP); Makoto Taniguchi, Obu (JP)

(73) Assignee: DENSO CORPORATION, Kariya (JP)

(*) Notice: Subject to any disclaimer, the term of this patent is extended or adjusted under 35 U.S.C. 154(b) by 334 days.

(21) Appl. No.: 14/560,871

(22) Filed: Dec. 4, 2014

(65) Prior Publication Data
US 2015/0162789 A1    Jun. 11, 2015

(30) Foreign Application Priority Data

Dec. 6, 2013 (JP) .................................. 2013-253089
Jul. 22, 2014 (JP) .................................. 2014-148573

(51) Int. Cl.
*H02K 1/27* (2006.01)

(52) U.S. Cl.
CPC ............. *H02K 1/278* (2013.01); *H02K 1/276* (2013.01); *H02K 2213/03* (2013.01)

(58) Field of Classification Search
CPC ...... H02K 1/273; H02K 1/2776; H02K 12/27; H02K 1/272; H02K 1/278; H02K 1/28;
(Continued)

(56) References Cited

U.S. PATENT DOCUMENTS

| 5,939,809 A | * | 8/1999 | Mobius | ................. H02K 1/278 |
| | | | | 310/156.13 |
| 2002/0135252 A1 | * | 9/2002 | Burton | ..................... H02K 1/28 |
| | | | | 310/156.12 |

(Continued)

FOREIGN PATENT DOCUMENTS

| JP | 2004-260960 | | | 9/2004 |
| JP | 2004260960 A | * | | 9/2004 |

(Continued)

OTHER PUBLICATIONS

JP 2004260960 A, machine translation document on Dec. 24, 2016.*

(Continued)

*Primary Examiner* — Hanh Nguyen
*Assistant Examiner* — Leda Pham
(74) *Attorney, Agent, or Firm* — Nixon & Vanderhye PC

(57) ABSTRACT

Each permanent magnet provided in a rotor includes a projection that projects toward a corresponding predetermined portion of the rotor core. An inner peripheral surface of each permanent magnet, which is radially opposed to the corresponding predetermined portion of the rotor core, includes a primary contacting portion and two primary non-contacting portions. The primary contacting portion contacts the corresponding predetermined portion of the rotor core at a circumferential location, which corresponds to the projection. The primary non-contacting portions do not contact the rotor core and are located on two circumferentially opposite sides, respectively, of the primary contacting portion.

11 Claims, 9 Drawing Sheets

(58) Field of Classification Search
CPC ........ H02K 15/03; H02K 29/03; H02K 1/274; H02K 1/165
See application file for complete search history.

(56) References Cited

U.S. PATENT DOCUMENTS

| | | | |
|---|---|---|---|
| 2004/0217664 A1* | 11/2004 | Kuwabara | H02K 15/03 310/156.21 |
| 2005/0200223 A1 | 9/2005 | Tajima et al. | |
| 2007/0085436 A1 | 4/2007 | Tajima et al. | |
| 2009/0179518 A1 | 7/2009 | Tajima et al. | |
| 2010/0244607 A1* | 9/2010 | Fujimoto | H02K 1/278 310/156.21 |
| 2012/0038236 A1 | 2/2012 | Tajima et al. | |
| 2012/0326547 A1* | 12/2012 | Suzuki | H02K 1/2746 310/156.15 |

FOREIGN PATENT DOCUMENTS

| | | |
|---|---|---|
| JP | 2012-105447 | 5/2012 |
| JP | 2012105447 A * | 5/2012 |

OTHER PUBLICATIONS

JP 2012105447 A, machine translation abstract onDec. 24, 2016.*
Office Action (3 pages) dated Nov. 17, 2015, issued in corresponding Japanese Application No. 2014-148573 and English translation (5 pages).

* cited by examiner

US 9,735,636 B2

ROTOR AND DYNAMO-ELECTRIC MACHINE HAVING THE SAME

CROSS REFERENCE TO RELATED APPLICATION

This application is based on and incorporates herein by reference Japanese Patent Application No. 2013-253089 filed on Dec. 6, 2013 and Japanese Patent Application No. 2014-148573 filed on Jul. 22, 2014.

TECHNICAL FIELD

The present disclosure relates to a rotor and a dynamo-electric machine having the same.

BACKGROUND

In a design field of a dynamo-electric machine, which has a rotor including permanent magnets as magnetic poles of the rotor, it has been demanded to reduce the amount of a rare material (e.g., a rate earth element), which is used as a material of the permanent magnets. In order to satisfy the above demand, it is conceivable to implement one design method in such a manner that the magnetic poles of the rotor are formed by the permanent magnets, which are intermittently arranged in the circumferential direction. In this way, in comparison to a case where the magnetic poles of the rotor are formed by a permanent magnet, which is magnetized to have the magnetic poles and is configured into a ring form, the total amount of the material of the permanent magnets can be reduced by eliminating the material from an intermediate location between each circumferentially adjacent two of the permanent magnets.

Various shapes have been proposed as a shape of each permanent magnet used in the above design method. For example, in a cross section of the rotor, which is take in a direction perpendicular to a rotational axis of the rotor, each permanent magnet may be configured into an arcuate form that extends along an outer peripheral surface of a rotor core, which has a circular cross section. Alternatively, each permanent magnet may be configured into an arcuate form having two projections, which radially inwardly project toward the rotor core at two circumferential sides, respectively, of a circumferential center of the permanent magnet, as disclosed in JP3833256B2 (corresponding to U.S. Pat. No. 5,939,809A). Further alternatively, each permanent magnet may be configured to have a flat opposing surface, which is radially opposed to the rotor core and is entirely flat.

However, in the case of the permanent magnet, which is configured into the arcuate form, a radius of curvature of the opposing surface of the permanent magnet, which is radially opposed to the rotor core, i.e., a radius of curvature of the inner peripheral surface of the permanent magnet may not coincide with a radius of curvature of the outer peripheral surface of the rotor core in some of the products due to presence of a manufacturing tolerance. Furthermore, the radius of curvature of the inner peripheral surface of the permanent magnet, which is configured into the arcuate form, may be changed through expansion or contraction of the permanent magnet depending on a temperature change. Therefore, in some cases, depending on a quality of the manufactured permanent magnet or the expansion or contraction of the permanent magnet caused by the temperature change, a gap may be formed between the circumferential center portion of the permanent magnet and the rotor core while the two circumferential ends of the permanent magnet contact the rotor core. In such a case, when an external force is applied to the permanent magnet, a stress is concentrated in a center portion of the permanent magnet to possibly cause a damage (e.g., breakdown, cracking, chipping) of the permanent magnet.

In the case of the permanent magnet, which is disclosed in JP3833256B2 (corresponding to U.S. Pat. No. 5,939,809A) and is configured into the arcuate form having the two projections, two circumferential ends of the permanent magnet do not contact the rotor core. Therefore, it is possible to limit the deformation of the permanent magnet, which results in displacement of the circumferential center portion of the permanent magnet away from the rotor core while the two circumferential ends of the permanent magnet serve as a fulcrum at the time of occurrence of the expansion or contraction of the permanent magnet caused by the temperature change. However, in the case of the permanent magnet, which is disclosed in JP3833256B2 (corresponding to U.S. Pat. No. 5,939,809A), the two projections of the permanent magnet contact the rotor core, and the gap is formed between the circumferential center portion of the permanent magnet and the rotor core. Therefore, similar to the permanent magnet, which does not have the projections, when an external force is applied to the permanent magnet, a stress may be concentrated in a center portion of the permanent magnet to possibly cause the damage of the permanent magnet.

In the case of the permanent magnet having the flat opposing surface, which is radially opposed to the rotor core, a gap is not formed between the center portion of the permanent magnet and the rotor core regardless of the expansion or contraction of the permanent magnet caused by the temperature change. In this case, even when an external force is applied to the permanent magnet, a stress is dispersed in the circumferential direction and is thereby not concentrated in the center portion of the permanent magnet. However, even in the case of the permanent magnet, which has the flat opposing surface, a possibility of warping of the permanent magnet is increased when the surface area of the flat opposing surface of the permanent magnet is increased. When a cutting process is added to improve a surface accuracy of the contacting surface of the permanent magnet, manufacturing costs are increased, and a yield rate of the permanent magnet may possibly be deteriorated.

SUMMARY

The present disclosure is made in view of the above disadvantages.

According to the present disclosure, there is provided a rotor for a dynamo-electric machine. The rotor includes a shaft, a rotor core, and a plurality of permanent magnets. The rotor core is fitted to the shaft and is fixed to the shaft. The permanent magnets are located on a radially outer side of the rotor core and are intermittently arranged in a circumferential direction. The plurality of permanent magnets is fixed to the rotor core at a plurality of predetermined portions, respectively, of the rotor core. One of each permanent magnet and a corresponding one of the plurality of predetermined portions of the rotor core, which are radially opposed to each other, includes a projection that projects toward the other one of each permanent magnet and the corresponding one of the plurality of predetermined portions of the rotor core. An inner peripheral surface of each permanent magnet, which is radially opposed to the corresponding one of the plurality of predetermined portions of the rotor core, includes a primary contacting portion and two primary non-contacting portions. The primary contacting portion contacts the corresponding one of the plurality of predetermined portions of the rotor core at a circumferential location, which corresponds to the projection. The two primary non-contacting portions do not contact the rotor core and are located on two circumferentially opposite sides, respectively, of the primary contacting portion.

BRIEF DESCRIPTION OF THE DRAWINGS

The drawings described herein are for illustration purposes only and are not intended to limit the scope of the present disclosure in any way.

DETAILED DESCRIPTION

Figure 1:
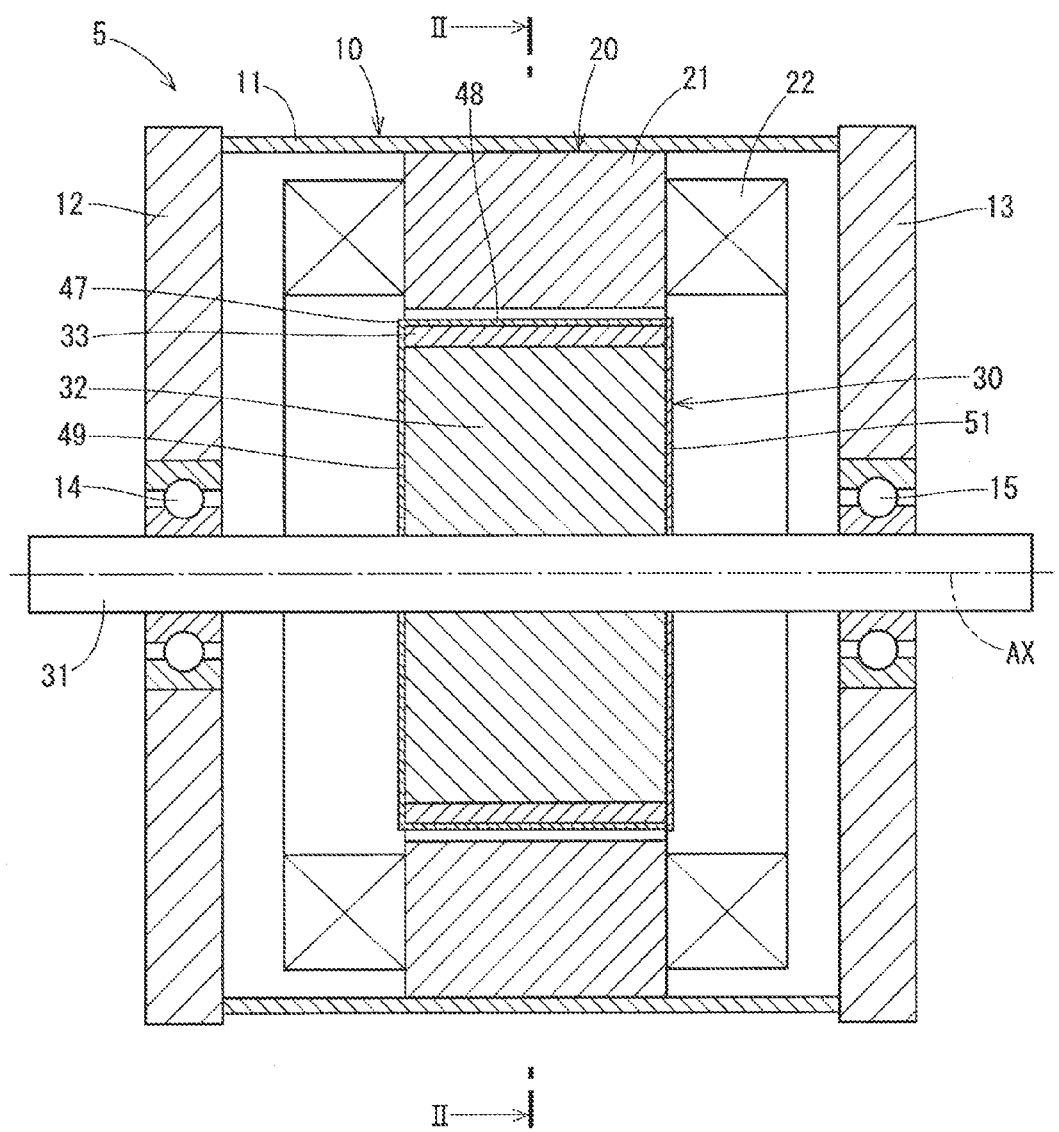
FIG. 1 is a cross sectional view for describing a structure of an electric motor having a rotor according to a first embodiment of the present disclosure.

Various embodiments of the present disclosure will be described with reference to the accompanying drawings. In the following discussion of the embodiments, similar components will be indicated by the same reference numerals and will not be described redundantly for the sake of simplicity.

(First Embodiment)

FIG. 1 indicates an electric motor, which serves as a dynamo-electric machine having a rotor according to a first embodiment of the present disclosure. The electric motor 5 is used as a drive source of a vehicle electric power steering apparatus.

First of all, an entire structure of the electric motor 5 will be described with reference to FIGS. 1 and 2.

The electric motor 5 is a three-phase brushless motor and includes a housing 10, a stator 20 and the rotor 30.

The housing 10 includes a tubular case 11, a first cover 12 and a second cover 13. The first cover 12 closes one end part of the tubular case 11, and the second cover 13 closes the other end part of the tubular case 11. Two bearings 14, 15 are respectively installed to a center portion of the first cover 12 and a center portion of the second cover 13.

The stator 20 forms an armature of the electric motor 5 and includes a stator core 21 and windings 22. The stator core 21 includes a yoke 23 and a plurality of teeth 24. The yoke 23 is configured into a cylindrical tubular form and is fixed to an inner peripheral wall surface of the tubular case 11 of the housing 10. The teeth 24 extend radially inward from the yoke 23 and are arranged at generally equal intervals in the circumferential direction along the yoke 23. Each corresponding one of the windings 22 is inserted into a corresponding slot defined between corresponding two of the teeth 24. The windings 22 form a U-phase winding, a V-phase winding, and a W-phase winding. In FIG. 2, the windings 22 are not indicated for the sake of simplicity.

The rotor 30 forms a permanent magnet field rotor of the electric motor 5 and includes a rotatable shaft 31, a rotor core 32 and a plurality of permanent magnets 33. The rotatable shaft 31 is rotatably supported by the bearing 14 and the bearing 15. The rotor core 32 is a tubular member that is fitted to and is fixed to an outer peripheral wall surface of the rotatable shaft 31 on a radially inner side of the stator 20. The permanent magnets 33 are located on a radially outer side of the rotor core 32 and are intermittently arranged in the circumferential direction. The permanent magnets 33 are fixed to the rotor core 32 at a plurality of predetermined portions (planar surfaces 41 described below), respectively, of the rotor core 32. The permanent magnets 33 are magnetized such that a polarity of a radially outer side magnetic pole of one of each circumferentially adjacent two of the permanent magnets 33 is opposite from a polarity of a radially outer side magnetic pole of the other one of the circumferentially adjacent two of the permanent magnets 33.

In the electric motor 5, which is constructed in the above described manner, when the windings 22 of the stator 20 are sequentially energized phase-by-phase, a rotating magnetic field is generated. Thereby, the rotor 30 is rotated together with the rotatable shaft 31 by a magnetic attractive force and a magnetic repulsive force generated by the rotating magnetic field.

Next, the characteristic structure of the electric motor 5 will be described with reference to FIGS. 1 to 3.

Figure 2:
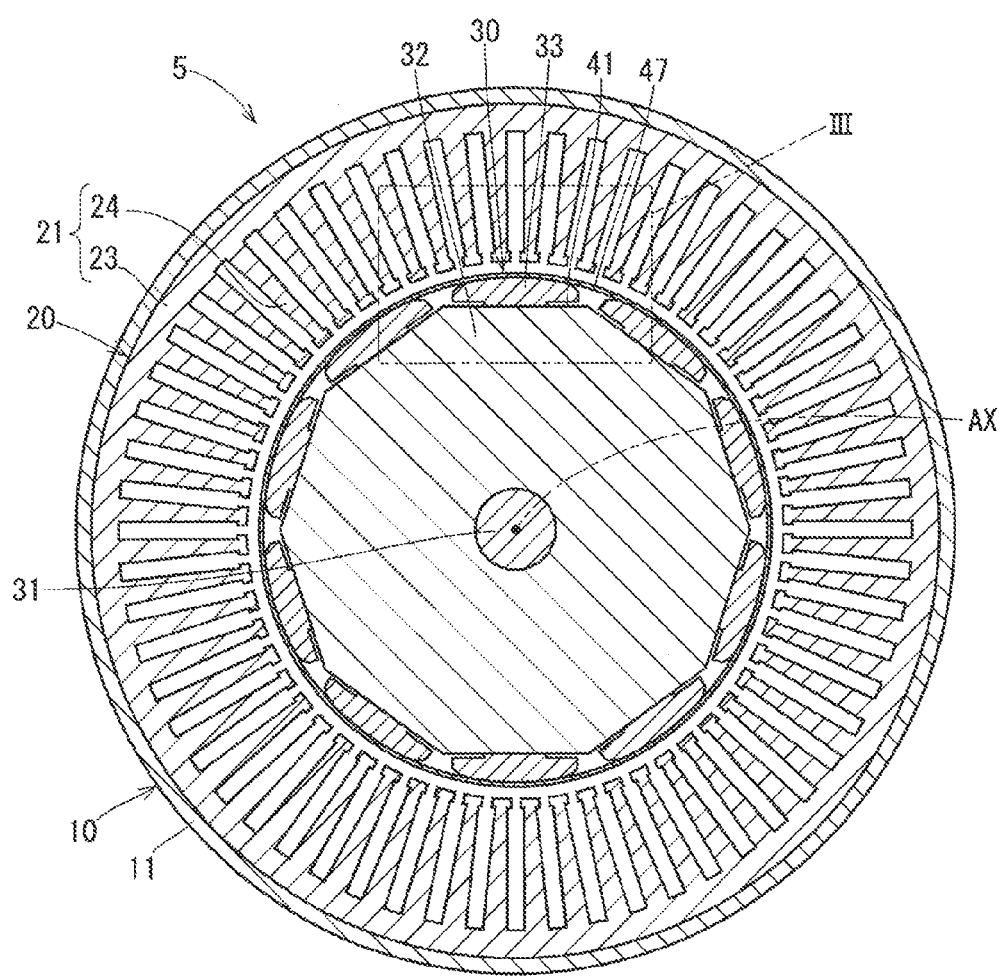
FIG. 2 is a cross-sectional view taken along line II-II in FIG. 1.

In the present embodiment, as shown in FIG. 2, a total number of the permanent magnets 33 provided in the rotor 30 is 10 (ten). In response to this, the rotor core 32 includes ten planar surfaces 41, which are arranged one after another in the circumferential direction. Specifically, the rotor core 32 is formed to have a cross section, which is taken in a direction perpendicular to the rotational axis AX and is configured into a decagon shape.

A total number of the slots of the stator core 21 is 60 (sixty). A number of the slots per pole per phase at the stator core 21 is 2 (two). The windings 22 are wound to form the full-pitch winding.

Figure 3:
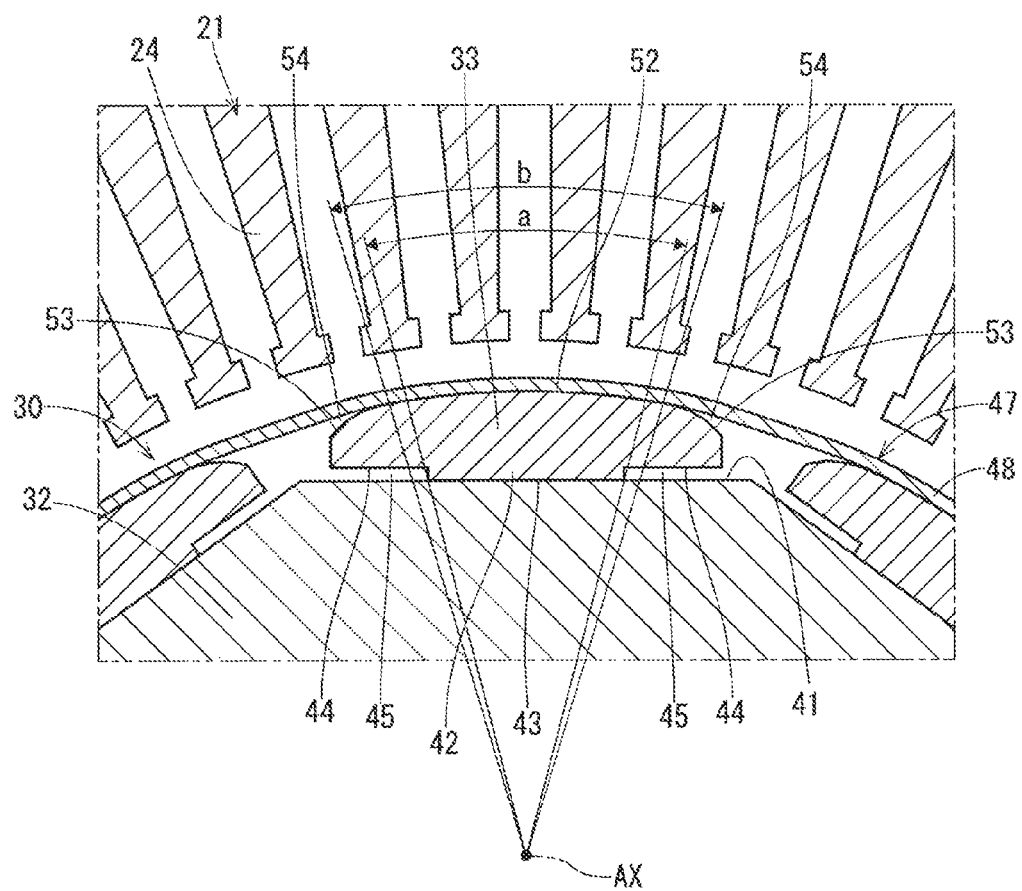
FIG. 3 is a partial enlarged view of an area III in FIG. 2.

As shown in FIG. 3, each of the permanent magnets 33 includes a projection 42 that projects toward the rotor core 32 (more specifically, the corresponding planar surface 41 of the rotor core 32). In the present embodiment, the projection 42 is located in a circumferential center portion of the permanent magnet 33.

An inner peripheral surface (a radially inner side surface or simply referred to as an inner side surface) of each permanent magnet 33, which is radially opposed to the corresponding one of the planar surfaces 41 of the rotor core 32, includes a primary contacting portion (single primary contacting portion) 43 and two primary non-contacting portions 44. In the permanent magnet 33, the primary contacting portion 43 is placed at a circumferential location, which corresponds to the projection 42, and the primary contacting portion 43 contacts the rotor core 32 to form a surface-to-surface contact with the rotor core 32. The primary non-contacting portions 44 are located on two circumferentially opposite sides, respectively, of the primary contacting portion 43 of the permanent magnet 33 and do not contact the rotor core 32. A gap 45 is formed between each primary non-contacting portion 44 and the corresponding planar surface 41 of the rotor core 32.

As shown in FIGS. 1 to 3, the rotor 30 includes a tubular cover 47, which is fitted to an outer peripheral surface of each permanent magnet 33. In the present embodiment, the tubular cover 47 includes a tubular portion 48 and a bottom portion 49. The tubular portion 48 is press fitted to the outer peripheral surface of each permanent magnet 33, and the bottom portion 49 closes one end part of the tubular portion 48. The other end part of the tubular portion 48 of the tubular cover 47, which is opposite from the one end part of the tubular portion 48 in an axial direction, is closed by a cover 51, which is configured into a plate form. The permanent magnets 33 are fixed to the rotor core 32 by the urging force of the tubular portion 48 of the tubular cover 47 without using the bonding agent.

As shown in FIG. 3, an outer peripheral surface (a radially outer side surface or simply referred to as an outer side surface) of each permanent magnet 33, which is radially opposed to the tubular cover 47, includes a secondary contacting portion (a single secondary contacting portion) 52 and two secondary non-contacting portions 53. In the permanent magnet 33, the secondary contacting portion 52 is located in a circumferential center portion of the outer peripheral surface of the permanent magnet 33 and contacts the tubular cover 47. The secondary non-contacting portions 53 are located on two circumferentially opposite sides, respectively, of the secondary contacting portion 52 of the permanent magnet 33 and do not contact the tubular portion 48 of the tubular cover 47. A gap 54 is formed between each secondary non-contacting portion 53 of the permanent magnet 33 and the tubular portion 48 of the tubular cover 47.

An urging load, which is exerted against each permanent magnet 33 by the tubular cover 47, is maximum in the circumferential center portion of the permanent magnet 33. The primary contacting portion 43 and the secondary contacting portion 52 of each permanent magnet 33 are placed at the circumferential center portion of the permanent magnet 33, i.e., at the circumferential position, at which the urging load of the tubular cover 47 exerted against the permanent magnet 33 is maximum along the circumferential extent of the permanent magnet 33.

As shown in FIG. 3, an angle between one circumferential end and another circumferential end of the primary contacting portion 43 of each permanent magnet 33 about the rotational axis AX is defined as a first angle a. Furthermore, an angle between one circumferential end and another circumferential end of the secondary contacting portion 52 of each permanent magnet 33 about the rotational axis AX is defined as a second angle b. Each permanent magnet 33 is formed to satisfy the following equation (1). Specifically, the first angle a is equal to or smaller than the second angle b. Furthermore, the second angle b is set to be a predetermined electrical angle, which is equal to or larger than 75 degrees and is equal to or smaller than 150 degrees.

$$a \leq b \qquad \text{Equation(1)}$$

Now, advantages of the first embodiment will be described.

As discussed above, in the first embodiment, each permanent magnet 33 includes the projection 42, which is located in the circumferential center portion of the permanent magnet 33 and projects toward the rotor core 32. Furthermore, the inner peripheral surface of the permanent magnet 33, which is radially opposed to the planar surface 41 of the rotor core 32, includes the primary contacting portion 43 and the two primary non-contacting portions 44. The primary contacting portion 43 contacts the corresponding planar surface 41 (the corresponding predetermined portion) of the rotor core 32 at the circumferential location, which corresponds to the projection 42, and the two primary non-contacting portions 44 are located on the two circumferentially opposite sides, respectively, of the primary contacting portion 43 and do not contact the rotor core 32.

With the above construction, a contact surface area between each permanent magnet 33 and the rotor core 32 can be minimized, and thereby each corresponding extent, for which a dimensional accuracy needs to be managed, can be minimized. In this way, it is possible to limit formation of a gap between the circumferential center portion of the permanent magnet 33 and the rotor core 32. Thus, an external force, which is applied to the permanent magnet 33, can be received by the corresponding portion of the rotor core 32, which contacts the primary contacting portion 43 of the permanent magnet 33. Therefore, according to the first embodiment, a damage of the permanent magnet 33 can be limited.

Furthermore, according to the first embodiment, the rotor 30 includes the tubular cover 47, which is fitted to the outer peripheral surfaces of the permanent magnets 33. The outer peripheral surface of each permanent magnet 33, which is radially opposed to the tubular cover 47, includes the secondary contacting portion 52 and the two secondary non-contacting portions 53. The secondary contacting portion 52 is located in a circumferential center portion of the outer peripheral surface of the permanent magnet 33 and contacts the tubular cover 47. The secondary non-contacting portions 53 are located on the two circumferentially opposite sides, respectively, of the secondary contacting portion 52 and do not contact the tubular portion 48 of the tubular cover 47.

With the above construction, it is possible to limit the application of the urging force of the tubular cover 47 to two circumferential end portions of the permanent magnet 33, which correspond to the secondary non-contacting portions 53, respectively, of the permanent magnet 33. Thereby, it is possible to limit the damage of the permanent magnet 33, which is caused by the application of the external force to the portions of the permanent magnet 33, i.e., the two circumferential end portions of the permanent magnet 33, which are not supported by the rotor core 32.

Furthermore, in the first embodiment, the first angle a is equal to or smaller than the second angle b.

With the above construction, it is possible to appropriately reduce the contact surface area between the permanent magnet 33 and the rotor core 32.

Here, the tubular cover 47 is deformed into a generally decagon shape due to the symmetric arrangement of the magnetic poles and holds the permanent magnets 33. At this time, an angle of a tangent line of the tubular cover 47 relative to the permanent magnet 33 is 72 degrees. In this case, when the second angle b, which has a significant relationship with the configuration of the outer peripheral surface of the permanent magnet 33, is set to be an electrical angle, which is equal to or smaller than 150 degrees, a cogging torque and/or a torque ripple can be significantly reduced. In contrast, when the second angle b is set to be excessively small, the contact surface area between the tubular cover 47 and the permanent magnet 33 becomes excessively small. In such a case, the holding force of the tubular cover 47 for holding the respective permanent magnets 33 is reduced, and a contact surface pressure, which is exerted from the tubular cover 47 against each permanent magnet 33, becomes excessively large to possibly cause a damage of the permanent magnet 33. Therefore, it is desirable that the second angle b is set to be an electrical angle, which is equal to or larger than 75 degrees. As a result, it is desirable that the second angle b is set to be a predetermined electrical angle, which is equal to or larger than 75 degrees and is equal to or smaller than 150 degrees. In the first embodiment, the second angle b is set to be an electrical angle of about 120 degrees.

Furthermore, in the first embodiment, the tubular cover 47 is press fitted to the outer peripheral surface of each permanent magnet 33, and thereby each of the permanent magnets 33 is urged against the rotor core 32 by the tubular cover 47 to fix each of the permanent magnets 33 to the rotor core 32 without using a bonding agent.

With this construction, it is possible to avoid occurrence of weakening of the fixation force, which fixes the permanent magnet to the rotor core 32, upon deterioration of the bonding agent by a heat cycle. Furthermore, in comparison to a case where the bonding agent is used to fix the permanent magnets to the rotor core, the manufacturing processes can be simplified according to the present embodiment, and thereby the manufacturing costs can be reduced.

Furthermore, according to the first embodiment, the primary contacting portion 43 and the secondary contacting portion 52 of each permanent magnet 33 are placed in the portion of the permanent magnet 33, at which the urging load of the tubular cover 47 exerted against the permanent magnet 33 is maximum, i.e., are placed in the circumferential center portion of the permanent magnet 33.

With this construction, the urging load of the tubular cover 47 can be received at the portion (more specifically, the secondary contacting portion 52) of the permanent magnet 33, which does not form a gap relative to the tubular cover 47, and the portion of the rotor core 32 (more specifically, the opposed surface portion of the corresponding planar surface 41, which is radially opposed to the primary contacting portion 43), which does not form a gap relative to the permanent magnet 33. Thereby, the damage of each permanent magnet 33 can be further limited.

(Second Embodiment)

A rotor according to a second embodiment of the present disclosure will be described with reference to FIG. 4.

Figure 4:
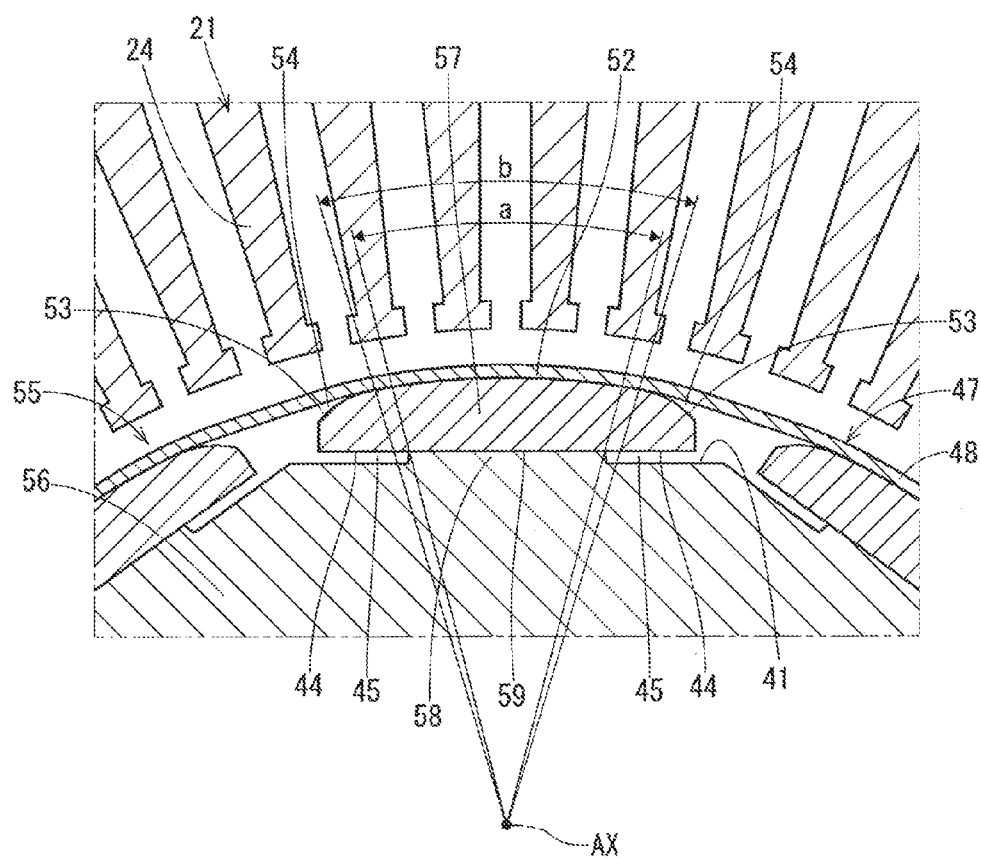
FIG. 4 is a partial enlarged cross-sectional view of an electric motor having a rotor according to a second embodiment of the present disclosure, showing a permanent magnet and an area around the permanent magnet.

As shown in FIG. 4, the rotor core 56 of the rotor 55 include a plurality of projections 58, each of which projects from the corresponding planar surface 41 of the rotor core 56 toward the corresponding permanent magnet 57. An inner peripheral surface (a radially inner side surface or simply referred to as an inner side surface) of each permanent magnet 57, which is radially opposed to the corresponding predetermined portion (the corresponding planar surface 41, which has the projection 58) of the rotor core 56, includes a primary contacting portion (single primary contacting portion) 59 and two primary non-contacting portions 44. A circumferential center portion of the primary contacting portion 59 contacts the projection 58. The primary non-contacting portions 44 are located on two circumferentially opposite sides, respectively, of the primary contacting portion 59 and do not contact the rotor core 56.

With the above construction, a contact surface area between each permanent magnet 57 and the rotor core 56 can be minimized, and thereby each corresponding extent, for which a dimensional accuracy needs to be managed, can be minimized. Therefore, according to the second embodiment, similar to the first embodiment, the damage of each permanent magnet 57 can be limited.

(Third Embodiment)

A rotor according to a third embodiment of the present disclosure will be described with reference to FIG. 5.

Figure 5:
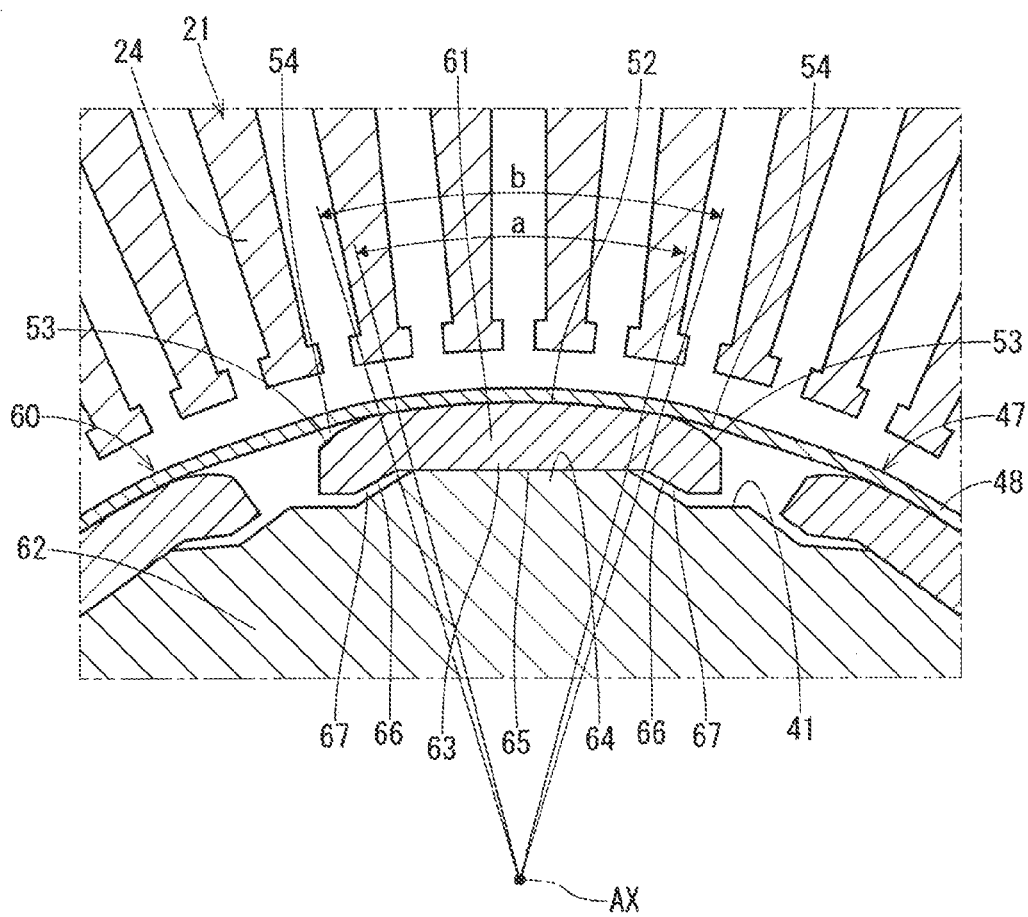
FIG. 5 is a partial enlarged cross-sectional view of an electric motor having a rotor according to a third embodiment of the present disclosure, showing a permanent magnet and an area around the permanent magnet.

As shown in FIG. 5, each of the permanent magnets 61 of the rotor 60 includes a recess 63, which is located in a circumferential center portion of the inner peripheral surface of the permanent magnet 61 and is recessed toward an opposite radial side (radially outer side) that is radially opposite from the rotor core 62. The rotor core 62 includes a plurality of projections 64, each of which projects from a corresponding one of the planar surfaces 41 of the rotor core 62 into the recess 63 of the corresponding permanent magnet 61 and contacts a bottom surface of the recess 63. An inner peripheral surface of each permanent magnet 61, which is radially opposed to the corresponding predetermined portion (the corresponding planar surface 41, which has the projection 64) of the rotor core 62, includes a primary contacting portion 65 and two primary non-contacting portions 66. In the permanent magnet 61, the primary contacting portion 65 forms the bottom surface of the recess 63. The primary non-contacting portions 66 are located on two circumferentially opposite sides, respectively, of the primary contacting portion 65 of the permanent magnet 61 and do not contact the rotor core 62. A gap 67 is formed between each of the primary non-contacting portions 66 of the permanent magnet 61 and the rotor core 62.

In the third embodiment, a volume of each permanent magnet 61 can be reduced in comparison to a permanent magnet, which does not have the recess 63. Therefore, according to the third embodiment, the material of the permanent magnet 61 can be reduced.

Furthermore, two circumferential end portions of each permanent magnet 61 do not contact the rotor core 62, and the circumferential center portion of each permanent magnet 61 contacts the rotor core 62 (making the surface-to-surface contact between the circumferential center portion of the permanent magnet 61 and the corresponding projection 64 of the rotor core 62). Therefore, according to the third embodiment, similar to the first embodiment, the damage of each permanent magnet 61 can be limited.

Furthermore, according to the present embodiment, each corresponding projection 64 of the rotor core 62 is fitted into the recess 63 of the corresponding permanent magnet 61. Thereby, each permanent magnet 61 can be stably installed to the rotor core 62. Thus, in comparison to the permanent magnet, which does not have the recess 63, the positioning of the permanent magnet 61 can be eased.

Furthermore, in the third embodiment, the recess 63 is formed in the circumferential center portion of the permanent magnet 61. Thus, while the volume of the permanent magnet 61 is reduced, the thickness (radial thickness) of each of the two circumferential end portions of the permanent magnet 61 can be made relatively large. In this way, for example, it is possible to limit a reduction in the magnetism of the permanent magnet 61 caused by influences, such as application of a magnetism of a magnetic field to the permanent magnet 61 in the opposite direction at the time of controlling of the electric motor, and the rise of the temperature of the motor to the high temperature.

(Fourth Embodiment)

A rotor according to a fourth embodiment of the present disclosure will be described with reference to FIG. 6.

Figure 6:
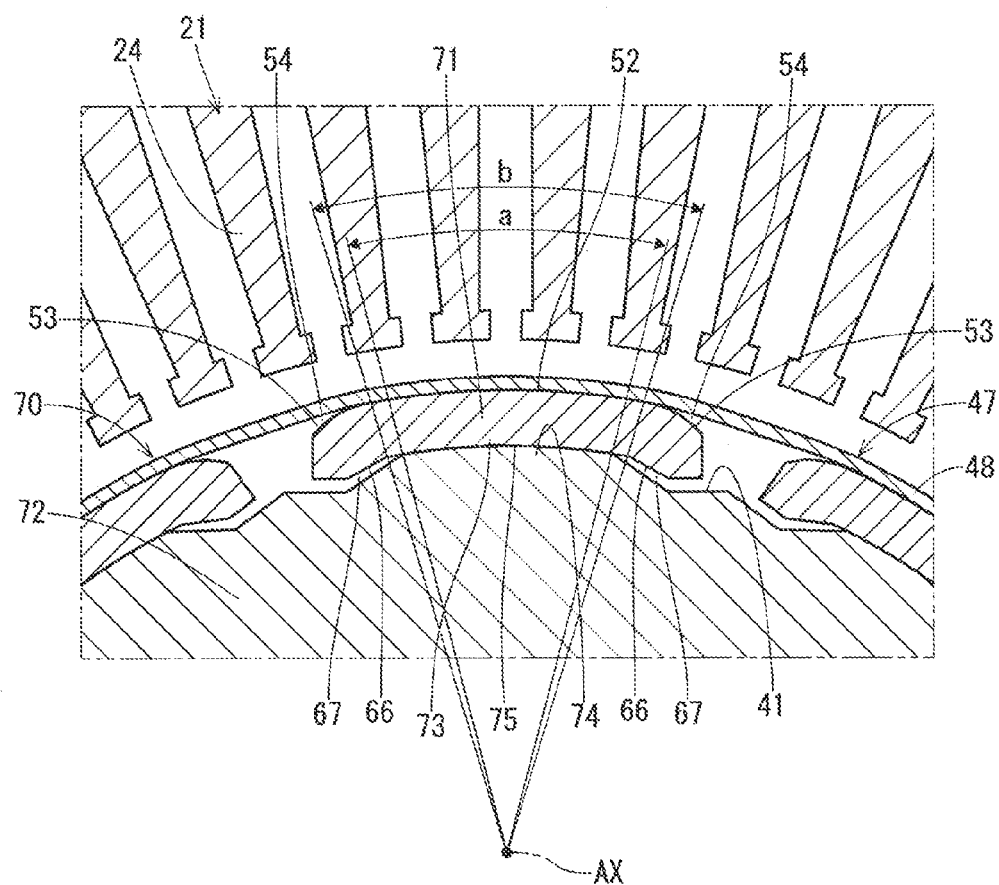
FIG. 6 is a partial enlarged cross-sectional view of an electric motor having a rotor according to a fourth embodiment of the present disclosure, showing a permanent magnet and an area around the permanent magnet.

As shown in FIG. 6, each of the permanent magnets 71 of the rotor 70 includes a recess 73, which is located in a circumferential center portion of the inner peripheral surface of the permanent magnet 71 and is recessed toward an opposite radial side (radially outer side) that is radially opposite from the rotor core 72. The rotor core 72 includes a plurality of projections 74, each of which projects from the corresponding planar surface 41 of the rotor core 72 into the recess 73 of the corresponding permanent magnet 71 and contacts a bottom surface of the recess 73. An inner peripheral surface of each permanent magnet 71, which is radially opposed to the corresponding predetermined portion (the corresponding planar surface 41, which has the projection 74) of the rotor core 62, includes a primary contacting portion 75 and two primary non-contacting portions 66. The primary contacting portion 75 forms the bottom surface of the recess 73. The primary non-contacting portions 66 are located on two circumferentially opposite sides, respectively, of the primary contacting portion 75 and do not contact the rotor core 72. The primary contacting portion 75 of the permanent magnet 71 is a curved surface (e.g., an arcuate surface), and a distal end surface (i.e., an outer peripheral surface also referred to as a radially outer end surface) of the projection 74 is also a curved surface (e.g., an arcuate surface).

In the third embodiment, a volume of each permanent magnet 71 can be reduced in comparison to a permanent magnet, which does not have the recess 73. Therefore, according to the fourth embodiment, similar to the third embodiment, the damage of each permanent magnet 71 can be limited or reduced.

Furthermore, two circumferential end portions of each permanent magnet 71 do not contact the rotor core 72, and the circumferential center portion of each permanent magnet 71 contacts the rotor core 72 (making the surface-to-surface contact between the circumferential center portion of the permanent magnet 71 and the corresponding projection 74 of the rotor core 72). Therefore, according to the fourth embodiment, similar to the first embodiment, the damage of each permanent magnet 71 can be limited.

(Fifth Embodiment)

A rotor according to a fifth embodiment of the present disclosure will be described with reference to FIG. 7.

Figure 7:
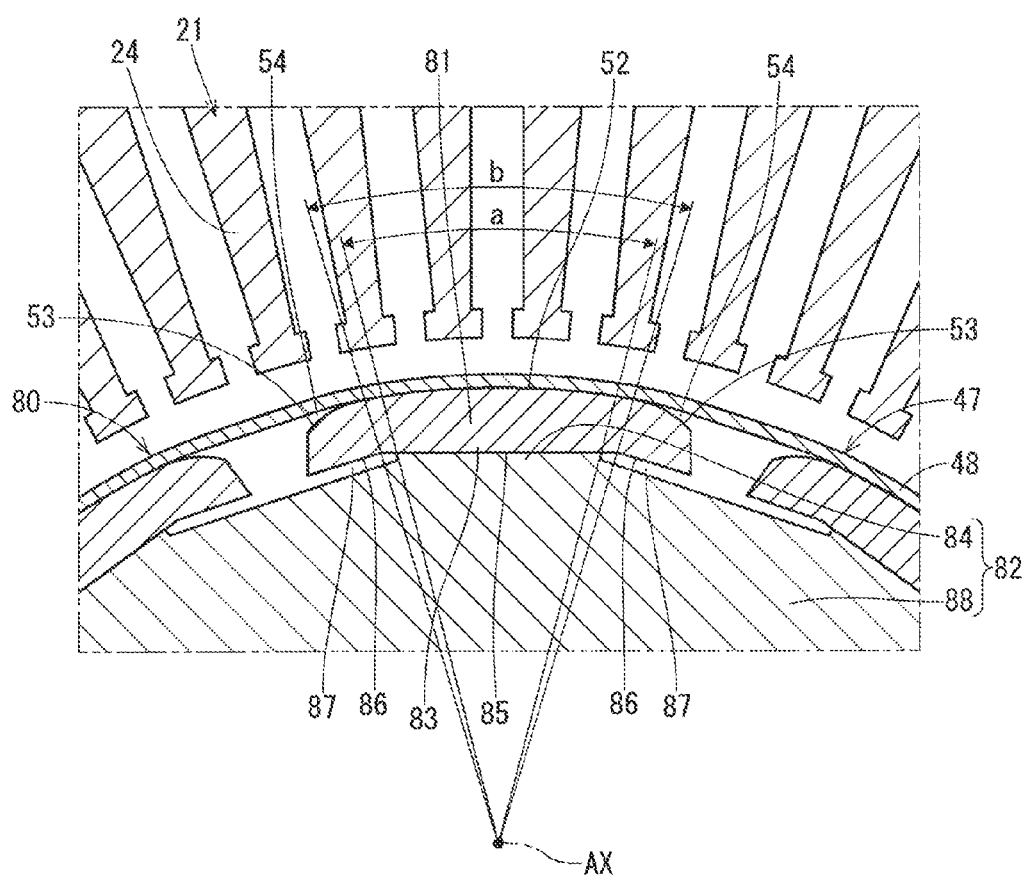
FIG. 7 is a partial enlarged cross-sectional view of an electric motor having a rotor according to a fifth embodiment of the present disclosure, showing a permanent magnet and an area around the permanent magnet.

As shown in FIG. 7, each of the permanent magnets 81 of the rotor 80 includes a recess 83, which is located in a circumferential center portion of the inner peripheral surface of the permanent magnet 81 and is recessed toward an opposite radial side (radially outer side) that is radially opposite from the rotor core 82. In this embodiment, a total number of the permanent magnets 81 is 2p where p denotes an integer number, and the rotor core 82 includes a polygonal portion 88 and a plurality of projections 84. The polygonal portion 88 has a cross section, which is taken in a direction perpendicular to an axial direction and is configured into a polygonal shape having a plurality of corners, and a total number of the corners is 4p where p denotes the integer number discussed above. Each projection 84 radially projects from the corresponding side of the polygonal portion 88 of the rotor core 82 (the corresponding predetermined portion of the rotor core 82) into a recess 83 of the corresponding permanent magnet 81 and contacts a bottom surface of the recess 83. A circumferential extent of the projection 84 is substantially equal to a circumferential extent of the corresponding side of the polygonal portion 88.

An inner peripheral surface of each permanent magnet 81, which is radially opposed to the corresponding predetermined portion (the corresponding side of the polygonal portion 88, which has the projection 84) of the rotor core 82, includes a primary contacting portion 85 and two primary non-contacting portions 86. The primary contacting portion 85 forms the bottom surface of the recess 83. The primary non-contacting portions 86 are located on two circumferentially opposite sides, respectively, of the primary contacting portion 85 and do not contact the rotor core 82. The primary contacting portion 85 of the permanent magnet 81 is a planar surface, and a distal end surface (i.e., an outer peripheral surface also referred to as a radially outer end surface) of the projection 84 is also a planar surface. A gap 87 is formed between each of the primary non-contacting portions 86 of the permanent magnet 81 and the rotor core 82.

In the fifth embodiment, a volume of each permanent magnet 81 can be reduced in comparison to a permanent magnet, which does not have the recess 83. Therefore, according to the fifth embodiment, the material of the permanent magnet 81 can be reduced.

Furthermore, two circumferential end portions of each permanent magnet 81 do not contact the rotor core 82, and the circumferential center portion of each permanent magnet 81 contacts the rotor core 62 (making the surface-to-surface contact between the circumferential center portion of the permanent magnet 81 and the corresponding projection 84 of the rotor core 82). Therefore, according to the fifth embodiment, similar to the first embodiment, the damage of each permanent magnet 81 can be limited.

Furthermore, in the fifth embodiment, the rotor core 82 includes the polygonal portion 88 that has the corners, and the number of the corners is twice the number of the permanent magnets 81. Each of the projections 84 is formed in the corresponding one of the sides of the polygonal portion 88, which corresponds to the permanent magnet 81. In this way, a shape of each intermediate portion of the rotor core 82, which is located between corresponding circumferentially adjacent two of the permanent magnets 81 and does not have a particular function, is simplified. Therefore, a process of forming the rotor core 82 is eased. In a case where the rotor core 82 is formed by stacking a plurality of thin plates, a lifetime of a press die, which is used to form the thin plates, can be improved, i.e., lengthened.

(Sixth Embodiment)

A rotor according to a sixth embodiment of the present disclosure, which is a modification of the third embodiment shown in FIG. 5, will be described with reference to FIG. 8.

Figure 8:
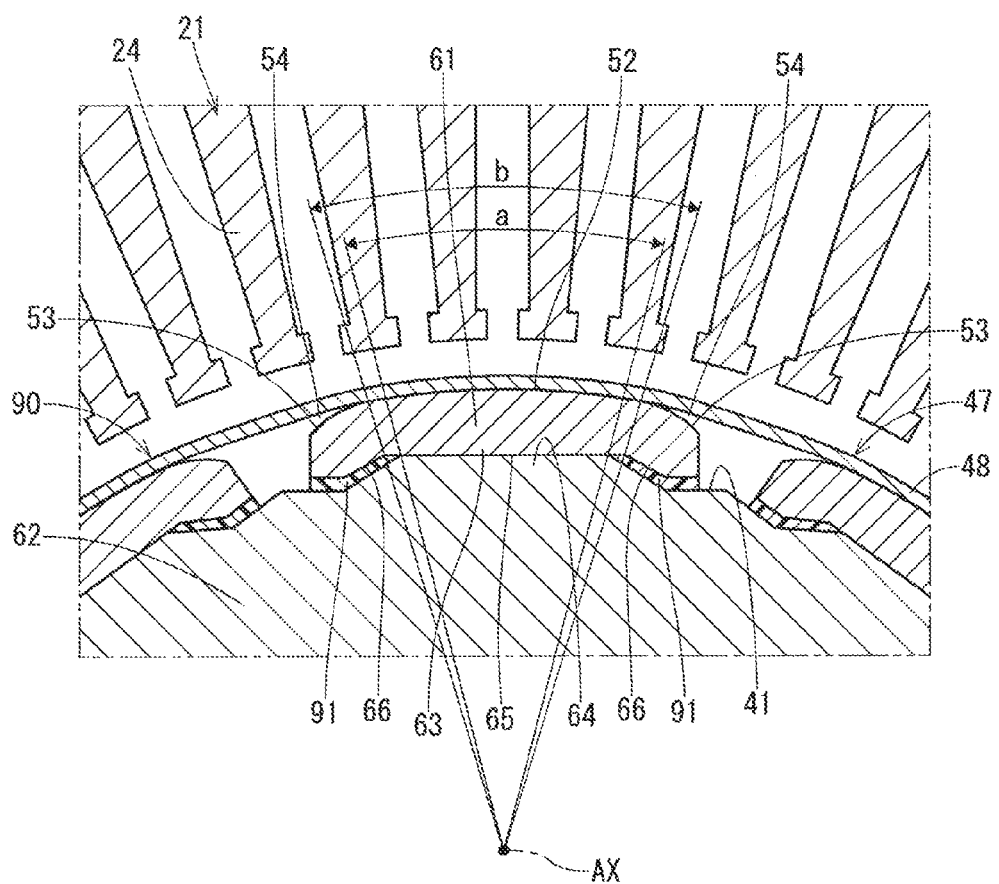
FIG. 8 is a partial enlarged cross-sectional view of an electric motor having a rotor according to a sixth embodiment of the present disclosure, showing a permanent magnet and an area around the permanent magnet.

As shown in FIG. 8, each of the permanent magnets 61 is urged against the rotor core 62 by the tubular cover 47 and is bonded to the rotor core 62 with a bonding agent 91, which is radially placed between each of the primary non-contacting portions 66 of the permanent magnet 61 and the rotor core 62, to fix each of the permanent magnets 61 to the rotor core 62.

Therefore, according to the sixth embodiment, the permanent magnets 61 can be more strongly fixed to the rotor core 62.

(Seventh Embodiment)

A rotor according to a seventh embodiment of the present disclosure, which is a modification of the sixth embodiment shown in FIG. 8, will be described with reference to FIG. 9.

Figure 9:
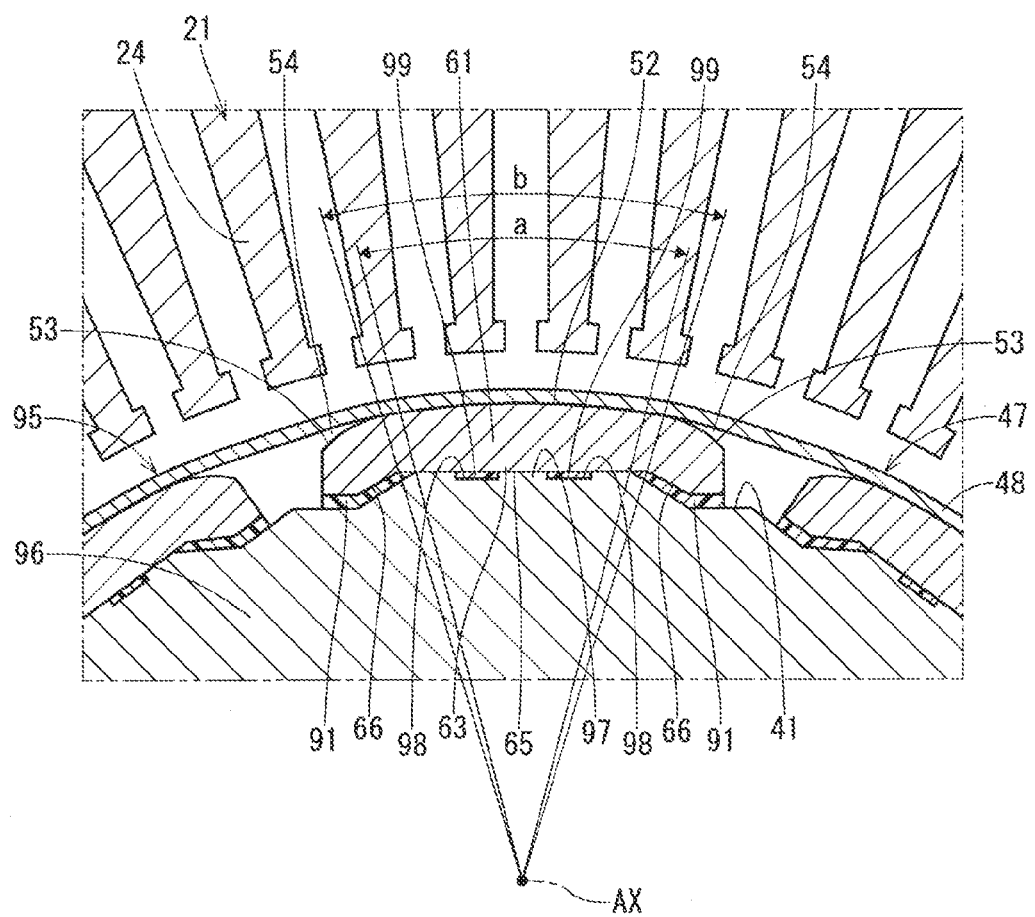
FIG. 9 is a partial enlarged cross-sectional view of an electric motor having a rotor according to a seventh embodiment of the present disclosure, showing a permanent magnet and an area around the permanent magnet.

With reference to FIG. 9, the rotor core 96 includes the projections 97, which are similar to the projections 64 of the rotor core 62 of the sixth embodiment except the following feature. Specifically, two grooves 98 are formed in an outer peripheral wall portion (or simply referred to as a wall portion) of each projection 97, which corresponds to the primary contacting portion 65 of the corresponding permanent magnet 61. The grooves 98 are located on two circumferentially opposite sides, respectively, of a circumferential center of the outer peripheral wall portion of the projection 97. Each of the permanent magnets 61 is urged against the rotor core 96 by the tubular cover 47 and is bonded to the rotor core 62 with a bonding agent 99, which is received in each of the grooves 98 of the corresponding projection 97 of the rotor core 96, besides the bonding agent 91 discussed in the sixth embodiment to fix each of the permanent magnet 61 to the rotor core 62.

Therefore, according to the seventh embodiment, the permanent magnets 61 can be more strongly fixed to the rotor core 96.

Now, modifications of the above embodiments will be described.

In a modification of the above embodiment(s), the tubular cover may not be press fitted to the outer peripheral surface of each permanent magnet and may be loosely fitted to the outer peripheral surface of each permanent magnet.

In another modification of the above embodiment(s), the entire outer peripheral surface of each permanent magnet may contact the tubular cover.

In another modification of the above embodiment(s), both of or one of the two end parts of the tubular case of the tubular cover may open.

In another modification of the above embodiments, the first angle may be the same as the second angle or may be larger than the second angle.

In another modification of the above embodiment(s), the total number of the permanent magnets may be other than 10 (ten), and the total number of the slots may be other than 60 (sixty).

In another modification of the above embodiment(s), the permanent magnets may be fixed to the rotor core by any other means (e.g., bonding with a bonding agent) without using the tubular cover.

In another modification of the above embodiment(s), the winding method of the windings of the stator is not limited to the full-pitch winding. In place of the full-pitch winding, the windings may be wound to form a short pitch winding or concentrating winding.

In another modification of the above embodiment(s), the rotor of the present disclosure is not limited to the rotor of the electric motor of the vehicle power steering apparatus and may be used as a rotor of any other appropriate dynamo-electric machine.

The present disclosure is not limited the above embodiments and modifications thereof. That is, the above embodiments and modifications thereof may be further modified in various ways without departing from the principle of the present disclosure.

What is claimed is:

1. A rotor for a dynamo-electric machine, comprising:
    a shaft;
    a rotor core that is fitted to the shaft and is fixed to the shaft; and
    a plurality of permanent magnets that are located on a radially outer side of the rotor core and are intermittently arranged in a circumferential direction while the plurality of permanent magnets is fixed to the rotor core at a plurality of predetermined portions, respectively, of the rotor core, wherein:
    one of each permanent magnet and a corresponding one of the plurality of predetermined portions of the rotor core, which are radially opposed to each other, includes a projection that projects toward the other one of each permanent magnet and the corresponding one of the plurality of predetermined portions of the rotor core;
    an inner peripheral surface of each permanent magnet, which is radially opposed to the corresponding one of the plurality of predetermined portions of the rotor core, includes:
        a primary contacting portion that contacts the corresponding one of the plurality of predetermined portions of the rotor core at a circumferential location, which corresponds to the projection; and
        two primary non-contacting portions that do not contact the rotor core and are located on two circumferentially opposite sides, respectively, of the primary contacting portion, wherein:
    each of the plurality of predetermined portions of the rotor core includes the projection, which projects toward the corresponding one of the plurality of permanent magnets;
    each of the plurality of permanent magnets includes a recess, which is radially opposed to the projection of the corresponding one of the plurality of predetermined portions of the rotor core;
    a bottom surface of the recess of each of the plurality of permanent magnets forms the primary contacting portion, which contacts the projection of the corresponding one of the plurality of predetermined portions of the rotor core;
    a circumferentially outer end of each of the two primary non-contacting portions in the inner peripheral surface of each permanent magnet is separated from the rotor core by a gap formed between each of the two primary non-contacting portions and the rotor core, and
    each of the two primary non-contacting portions in the inner peripheral surface of each permanent magnet is bent radially inward relative to the primary contacting portion of the permanent magnet.

2. The rotor according to claim 1, wherein:
    a total number of the plurality of permanent magnets is 2p where p denotes an integer number;
    the rotor core includes a polygonal portion that has a cross section, which is taken in a direction perpendicular to an axial direction and is configured into a polygonal shape having a plurality of corners, wherein a total number of the plurality of corners is 4p where p denotes the integer number; and
    each of the plurality of predetermined portions of the rotor core, which is placed in a corresponding one of a plurality of sides of the polygonal portion, includes the projection, which projects toward the corresponding one of the plurality of permanent magnets.

3. The rotor according to claim 1, further comprising a tubular cover, which is fitted to an outer peripheral surface of each of the plurality of permanent magnets, wherein:
    the outer peripheral surface of each of the permanent magnets, which is radially opposed to the tubular cover, includes:
        a secondary contacting portion that is located in a circumferential center portion of the outer peripheral surface of the permanent magnet and contacts the tubular cover; and
        two secondary non-contacting portions that do not contact the tubular cover and are located on two circumferentially opposite sides, respectively, of the secondary contacting portion.

4. The rotor according to claim 3, wherein the primary contacting portion and the secondary contacting portion in each of the plurality of permanent magnets are placed at a circumferential position, at which an urging load of the tubular cover exerted against the permanent magnet is maximum along a circumferential extent of the permanent magnet.

5. The rotor according to claim 3, wherein:
the shaft and the rotor core are rotatable about a rotational axis;
a first angle is defined about the rotational axis between one circumferential end and another circumferential end of the primary contacting portion of each of the plurality of permanent magnets;
a second angle is defined about the rotational axis between one circumferential end and another circumferential end of the secondary contacting portion of each of the plurality of permanent magnets; and
the first angle is equal to or smaller than the second angle.

6. The rotor according to claim 5, wherein when the second angle is set to be a predetermined electrical angle, which is equal to or larger than 75 degrees and is equal to or smaller than 150 degrees.

7. The rotor according to claim 3, wherein:
the tubular cover is press fitted to the outer peripheral surface of each of the plurality of permanent magnets; and
each of the plurality of permanent magnets is urged against the rotor core by the tubular cover to fix each of the plurality of permanent magnets to the rotor core.

8. The rotor according to claim 3, wherein:
the tubular cover is press fitted to the outer peripheral surface of each of the plurality of permanent magnets; and
each of the plurality of permanent magnets is urged against the rotor core by the tubular cover and is bonded to the rotor core with a bonding agent, which is radially placed between each of the two primary non-contacting portions of the permanent magnet and the rotor core, to fix each of the plurality of permanent magnets to the rotor core.

9. The rotor according to claim 1, wherein:
each of the plurality of permanent magnets or the corresponding one of the plurality of predetermined portions of the rotor core, which are radially opposed to each other, has a wall portion that corresponds to the primary contacting portion, and the wall portion includes a groove; and
each of the plurality of permanent magnets is fixed to the rotor core with a bonding agent received in the groove of the wall portion.

10. The rotor according to claim 1, wherein the rotor is used in a drive electric motor of a vehicle electric power steering apparatus.

11. A dynamo-electric machine comprising:
the rotor according to claim 1; and
a stator that is placed on a radially outer side of the rotor, wherein a number of slots per pole per phase at the stator is 2.

* * * * *